(12) United States Patent
Klinghult

(10) Patent No.: US 8,198,568 B2
(45) Date of Patent: Jun. 12, 2012

(54) INPUT SENSITIVE USER INTERFACE

(75) Inventor: Gunnar Klinghult, Lund (SE)

(73) Assignee: Sony Mobile Communications AB, Lund (SE)

( * ) Notice: Subject to any disclaimer, the term of this patent is extended or adjusted under 35 U.S.C. 154(b) by 1636 days.

(21) Appl. No.: 11/551,345

(22) Filed: Oct. 20, 2006

(65) Prior Publication Data
US 2008/0085743 A1   Apr. 10, 2008

Related U.S. Application Data

(60) Provisional application No. 60/826,649, filed on Sep. 22, 2006.

(51) Int. Cl.
*H05B 1/02* (2006.01)
(52) U.S. Cl. ............... 219/497; 219/501; 219/506
(58) Field of Classification Search .......... 219/494, 219/497, 499, 501, 505, 506; 345/169
See application file for complete search history.

(56) References Cited

U.S. PATENT DOCUMENTS

| | | | |
|---|---|---|---|
| 6,330,457 B1 | 12/2001 | Yoon | |
| 7,076,268 B2 | 7/2006 | Blacklock et al. | 455/550.1 |
| 8,014,789 B2 * | 9/2011 | Breed | 455/456.1 |
| 2003/0129964 A1 | 7/2003 | Kohinata et al. | |
| 2005/0253815 A1 | 11/2005 | Blacklock et al. | |
| 2007/0200734 A1 * | 8/2007 | Lee et al. | 341/22 |

FOREIGN PATENT DOCUMENTS

| | | |
|---|---|---|
| DE | 100 34 198 C1 | 8/2001 |
| EP | 1 109 382 A2 | 6/2001 |

OTHER PUBLICATIONS

International Search Report with Written Opinion mailed Sep. 19, 2007 (12 pages).
International Preliminary Report on Patentability issued in corresponding international application No. PCT/IB2007/051009, mailed Dec. 16, 2008, 7 pages.

* cited by examiner

*Primary Examiner* — Mark Paschall
(74) *Attorney, Agent, or Firm* — Patrick B. Horne; Moore & Van Allen, PLLC

(57) ABSTRACT

A device may include a thermo-sensitive, tactile-responsive user interface that may be used in activating and/or deactivating a key lock function to control operation of the user interface.

22 Claims, 4 Drawing Sheets

INPUT SENSITIVE USER INTERFACE

RELATED APPLICATIONS

This application claims priority under 35 U.S.C. §119 based on U.S. Provisional Application Ser. No. 60/826,649, filed Sep. 22, 2006, the disclosure of which is incorporated herein by reference.

TECHNICAL FIELD OF THE INVENTION

The invention relates generally to communication devices and, more particularly, to providing control of input operations.

DESCRIPTION OF RELATED ART

A communication device, such as a cellular telephone, typically includes a number of input mechanisms/user interfaces via which a user may input information during operation of the device. For example, cellular telephones typically include keys, buttons, dials, and the like that are designed for manual operation by a user, e.g., manipulation by the user's finger. Such input mechanisms, however, may be unintentionally operated, for example, when contacted by objects other than the user's finger or subjected to handling by the user.

SUMMARY

According to one aspect, a mobile communication device having a plurality of user input mechanisms includes a housing that supports the user input mechanisms; at least one sensor configured to sense a thermal parameter and another parameter associated with at least a first one of the user input mechanisms; and logic to enable operation of the at least first user input mechanism based on thermal information and other parameter information sensed by the at least one sensor.

Additionally, the other parameter information may include tactile information.

Additionally, the logic may be configured to enable the operation of the at least first user input mechanism based on a concurrent sensing of the thermal information and the other parameter information.

Additionally, the thermal information may include a temperature at the at least first user input mechanism.

Additionally, the logic may be configured to determine a reference thermal state based on sensing reference thermal information.

Additionally, the mobile communication device may include at least one other sensor configured to sense a third parameter, wherein the logic is further configured to determine whether the reference thermal state is valid based on a predetermined value, and when the reference thermal state is invalid, the logic is configured to enable the operation of the at least first user input device based on third parameter information sensed by the at least one other sensor.

Additionally, the thermal information may include a time rate-of-change of a temperature at the at least first user input mechanism.

Additionally, the logic may be configured to enable the operation of the at least first user input mechanism when a thermal value threshold value is achieved.

Additionally, the logic may be configured to determine whether the reference thermal state is valid, wherein when the reference thermal state is determined to be invalid, the thermal threshold value is deemed to have been achieved.

Additionally, the logic may be configured to enable the operation of at least a second one of the user input mechanisms based on thermal information associated with the at least second one of the user input mechanisms.

Additionally, the logic may be configured to enable operation of another one of the plurality of user input mechanisms based on the enabled operation of the at least first input mechanism.

Additionally, the other parameter may be selected by a user.

Additionally, the logic may be configured to disable the operation of the at least first user input mechanism after a predetermined amount of time.

Additionally, the logic may be configured to disable the operation of the at least first user input mechanism after a predetermined amount of time.

Additionally, the logic may be configured to disable the operation of the at least first user input mechanism based on the thermal information and the other parameter information sensed by the at least one sensor.

According to another aspect, in a communication device including a plurality of user input devices configured to be manually operated by a user, a method may include detecting, by a thermal sensor, a thermal value at a first one of the user input devices; detecting, by a second sensor, another parameter value at the first user-input device; and deactivating a lock on operation of the first user input device when the detected thermal value attains a first threshold and the detected other parameter value attains a second threshold.

Additionally, the method may further include deactivating a lock on operation of at least a second of the user input devices when the first and second thresholds are attained.

Additionally, the method may further include determining a reference thermal state at the first user input device using the thermal sensor; and determining whether the reference thermal state is valid.

Additionally, the method may further include deeming the thermal value threshold to be attained irrespective of the detected thermal value or ignoring the thermal value with respect to deactivating the lock.

Additionally, the method may further include detecting, by a third sensor, a third parameter value at the first input device; and deactivating the lock when the detected third parameter value reaches a third threshold.

Additionally, the thermal value threshold may be based on a difference between the reference thermal state and the detected thermal value.

According to still another aspect, a device including a key lock may include means for receiving user input; means for detecting a tactile input associated with the received user input; means for detecting a thermal value associated with the received user input; and means for deactivating the key lock when the detected tactile input and the detected thermal value attain respective predetermined threshold values.

Additionally, the device may include means for determining a heat transfer rate associated with the thermal value, wherein one of the predetermined threshold values is based on the heat transfer rate.

According to yet another aspect, a device may include a thermo-sensitive, tactile-responsive user interface; and a key lock to control input via the user interface, wherein operation of the key lock is based on a first temperature and a touch detected by the user interface.

Additionally, the detection of the first temperature occurs concurrently with the detection of the touch.

Other features and advantages of the invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation may represent like elements throughout.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods consistent with the principles of the invention may provide a thermal-based type of key lock functionality for controlling operation of one or more user input mechanisms (e.g., keys, buttons, dials, display panel, etc.).

Figure 1:
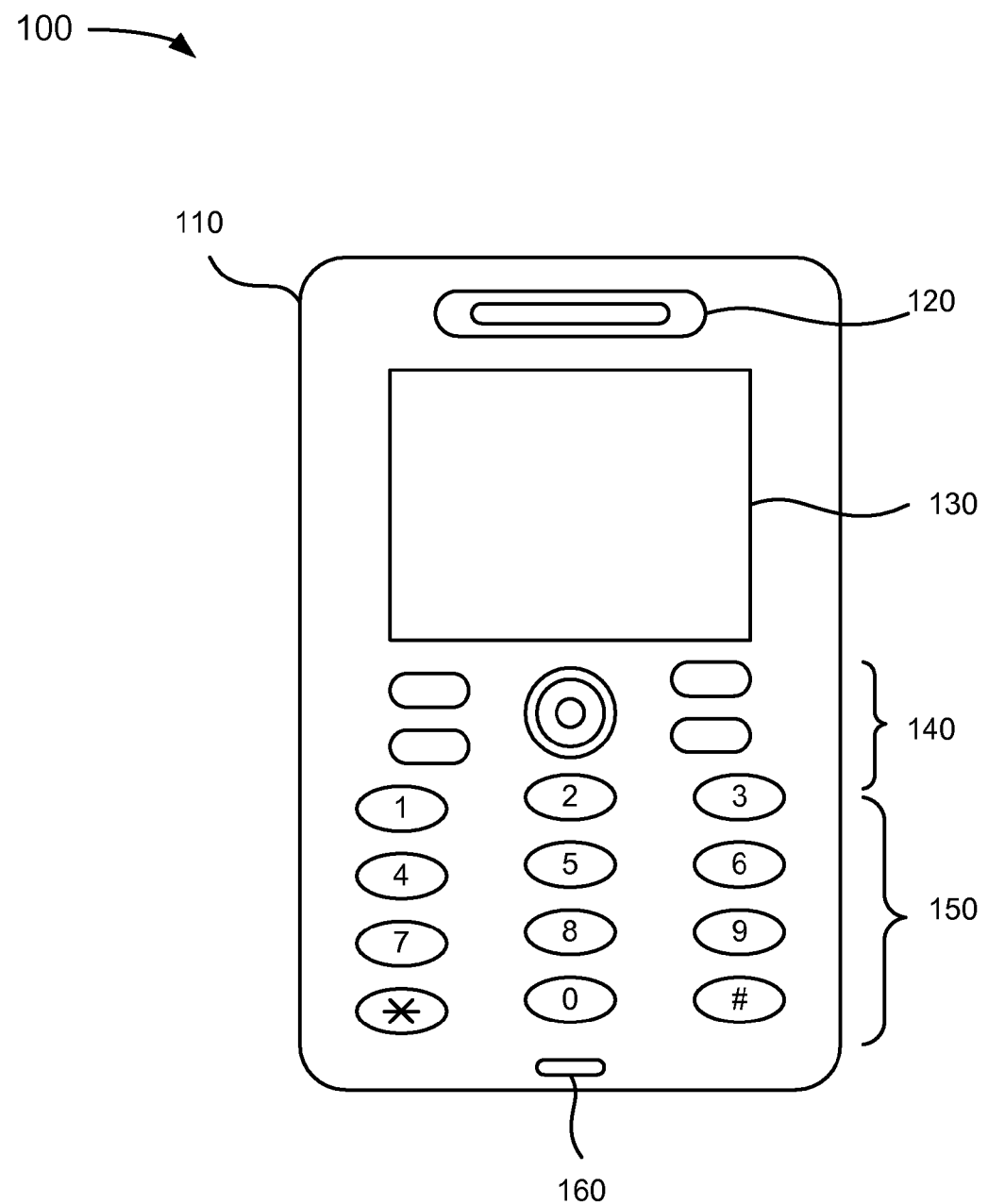
FIG. 1 is a diagram of an exemplary mobile terminal in which methods and systems described herein may be implemented.

FIG. 1 is a diagram of an exemplary mobile terminal 100 in which methods and systems described herein may be implemented. The invention is described herein in the context of a mobile terminal. As used herein, the term "mobile terminal" may include a cellular radiotelephone with or without a multi-line display; a Personal Communications System (PCS) terminal that may combine a cellular radiotelephone with data processing, facsimile and data communications capabilities; a personal digital assistant (PDA) that can include a radiotelephone, pager, Internet/Intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices. Mobile terminal 100 may also include media playing capability. It should also be understood that systems and methods described herein may also be implemented in other devices that include various input mechanisms designed to be manually operated without including various other communication functionality.

Referring to FIG. 1, mobile terminal 100 may include a housing 110, a speaker 120, a display 130, control buttons 140, a keypad 150, and a microphone 160. Housing 110 may include any structure to support the components of mobile terminal 100. Speaker 120 may include any mechanism(s)/device(s) via which audible information may be provided from mobile terminal 100. Display 130 may include any device that provides visual information to the user. For example, display 130 may provide information regarding incoming or outgoing calls, games, phone books, the current time, etc. Display 130 may include a liquid crystal display (LCD) or some other type of display via which information may be provided from mobile terminal 100.

Control buttons 140 may include any function keys that permit a user to interact with mobile terminal 100 to cause mobile terminal 100 to perform one or more operations, such as place a telephone call, play various media, etc. For example, control buttons 140 may include a dial button, hang up button, play button, etc. Control buttons 140 may also include a key-lock button that permits the user to activate/deactivate various input mechanisms, such as display 130, control buttons 140, keypad 150, and microphone 160, as described in more detail below. Keypad 150 may include a standard telephone keypad, for example, and/or additional function keys. Microphone 160 may receive audible information from the user, for example, to activate commands.

In an exemplary implementation, as described in detail below, display 130, control buttons 140, and/or keypad 150 may also include additional elements/components that allow a user to interact with mobile terminal 100 to cause mobile terminal 100 to perform one or more operations, such as place a telephone call, play various media, etc. In one implementation, display 130, control buttons 140, and/or keypad 150 may include one or more input mechanisms that function as a tactile-responsive or touch-activated user input interface. For example, input mechanisms of display 130, control buttons 140, and/or keypad 150 may include a pressure-sensitive (e.g., resistive), electrically-sensitive (e.g., capacitive), acoustically-sensitive (e.g., surface acoustic wave), photo-sensitive (e.g., infrared), and/or any other type of an overlay or mechanism that allows the various input mechanisms to be operated by a user's finger. In one implementation, input mechanisms of display 130, control buttons 140, and/or keypad 150 may be configured to be operated by touching or substantially contacting the user's finger. In other implementations, input mechanisms of display 130, control buttons 140, and/or keypad 150 may be configured to be operated by sensing a presence of the user's finger within a proximity of the input mechanisms.

In addition, one or more of the input mechanisms may include a thermal sensor. The thermal sensor may be a single sensor or an array of sensors. Physical properties and/or arrangement of the sensor may be selected to produce temperature measurement times on the order of seconds and/or fractions of seconds, such as tenths, hundredths, milliseconds, or less. Temperature sensing capabilities may be based on, for example, the mass, surface area, shape, material composition, etc., of the sensor.

An input mechanism may include two or more types of the above-described sensors. In one implementation, an input mechanism (e.g., key, button, dial, etc.) may be integrally formed with a type of tactile-responsive sensor and a type of thermal sensor. For example, an input mechanism may provide a single point of contact at which two or more parameters may be detected via two or more types of sensors integrated with the input mechanism.

Figure 2:
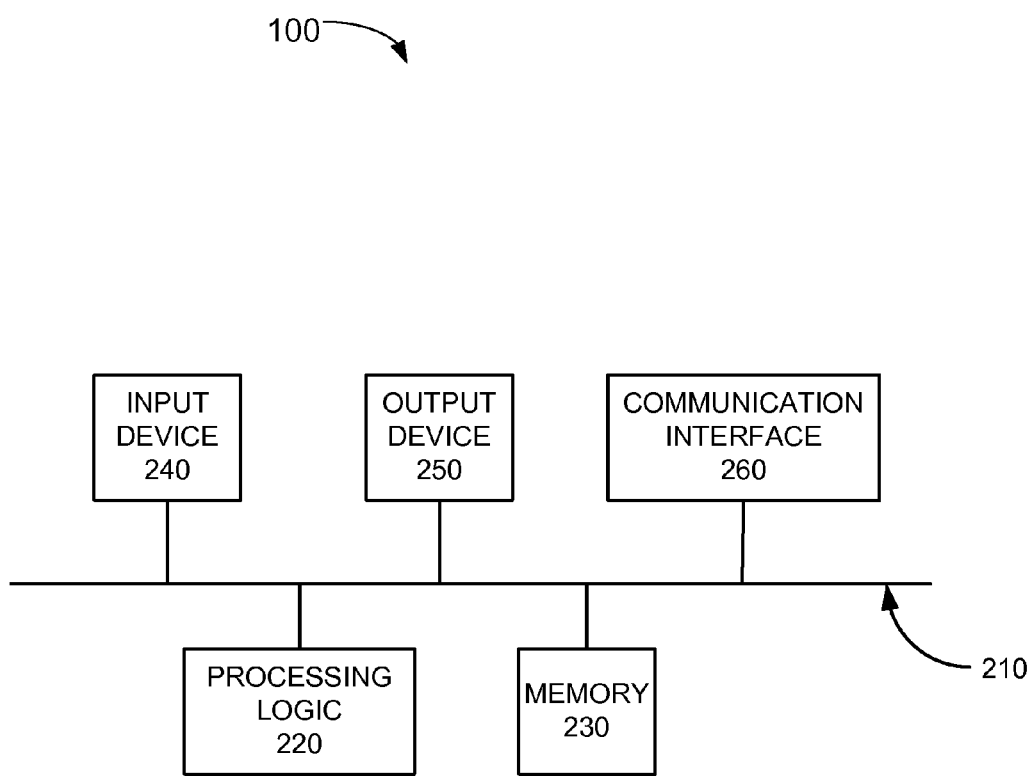
FIG. 2 is a diagram illustrating components of the mobile terminal of FIG. 1 according to an exemplary implementation.

FIG. 2 is a diagram illustrating components of mobile terminal 100 according to an exemplary implementation. Mobile terminal 100 may include processing logic 220, memory 230, input device 240, output device 250, communication interface 260, and a bus 210 that permits communication among the components of mobile terminal 100. One skilled in the art would recognize that mobile terminal 100 may be configured in a number of other ways and may include other or different elements. For example, mobile terminal 100 may include one or more power supplies (not shown). Mobile terminal 100 may also include one or more modulators, demodulators, encoders, decoders, transceivers, antennas, etc., for transmitting/receiving and processing data.

Processing logic 220 may include a processor, microprocessor, an application specific integrated circuit (ASIC), field programmable gate array (FPGA) or the like. Processing logic 220 may execute software instructions/programs or data structures to control operation of mobile terminal 100.

Memory 230 may include a random access memory (RAM) or another type of dynamic storage device that stores information and instructions for execution by processing logic 220; a read only memory (ROM) or another type of static storage device that stores static information and instructions for use by processing logic 220; a flash memory (e.g., an electrically erasable programmable read only memory (EEPROM)) device for storing information and instructions; and/or some other type of magnetic or optical recording medium and its corresponding drive. Memory 230 may also be used to store temporary variables or other intermediate information during execution of instructions by processing logic 220. Instructions used by processing logic 220 may also, or alternatively, be stored in another type of computer-readable medium accessible by processing logic 220. A computer-readable medium may include one or more memory devices and/or carrier waves.

Input device 240 may include mechanisms that permit an operator to input information to mobile terminal 100, such as microphone 160, keypad 150, control buttons 140, display 130, a keyboard, a mouse, a pen, a stylus, voice recognition and/or biometric mechanisms, etc.

Output device 250 may include one or more mechanisms that output information to the user, including a display, such as display 130, a printer, one or more wired or wireless speakers, such as speaker 120, etc. Output device 250 may also include a vibrator mechanism that causes mobile terminal 100 to vibrate when a call is received.

Communication interface 260 may include any transceiver-like mechanism that enables mobile terminal 100 to communicate with other devices and/or systems. For example, communication interface 260 may include a modem or an Ethernet interface to a LAN. Communication interface 260 may also include mechanisms for communicating via a network, such as a wireless network. For example, communication interface 260 may include one or more radio frequency (RF) transmitters, receivers and/or transceivers. Communication interface 260 may also include one or more antennas for transmitting and receiving RF data.

Mobile terminal 100 may provide a platform for a user to place and/or receive telephone calls, access the Internet, play various media, such as music files, video files, multi-media files, games, etc. Mobile terminal 100 may also provide mechanism(s) to control user input via any number of input mechanisms, as described in detail below. Mobile terminal 100 may perform these operations in response to processing logic 220 executing sequences of instructions contained in a computer-readable medium, such as memory 230. Such instructions may be read into memory 230 from another computer-readable medium via, for example, communication interface 260. A computer-readable medium may include one or more memory devices and/or carrier waves. In alternative embodiments, hard-wired circuitry may be used in place of or in combination with software instructions to implement processes consistent with the invention. Thus, implementations described herein are not limited to any specific combination of hardware circuitry and software.

Figure 3:
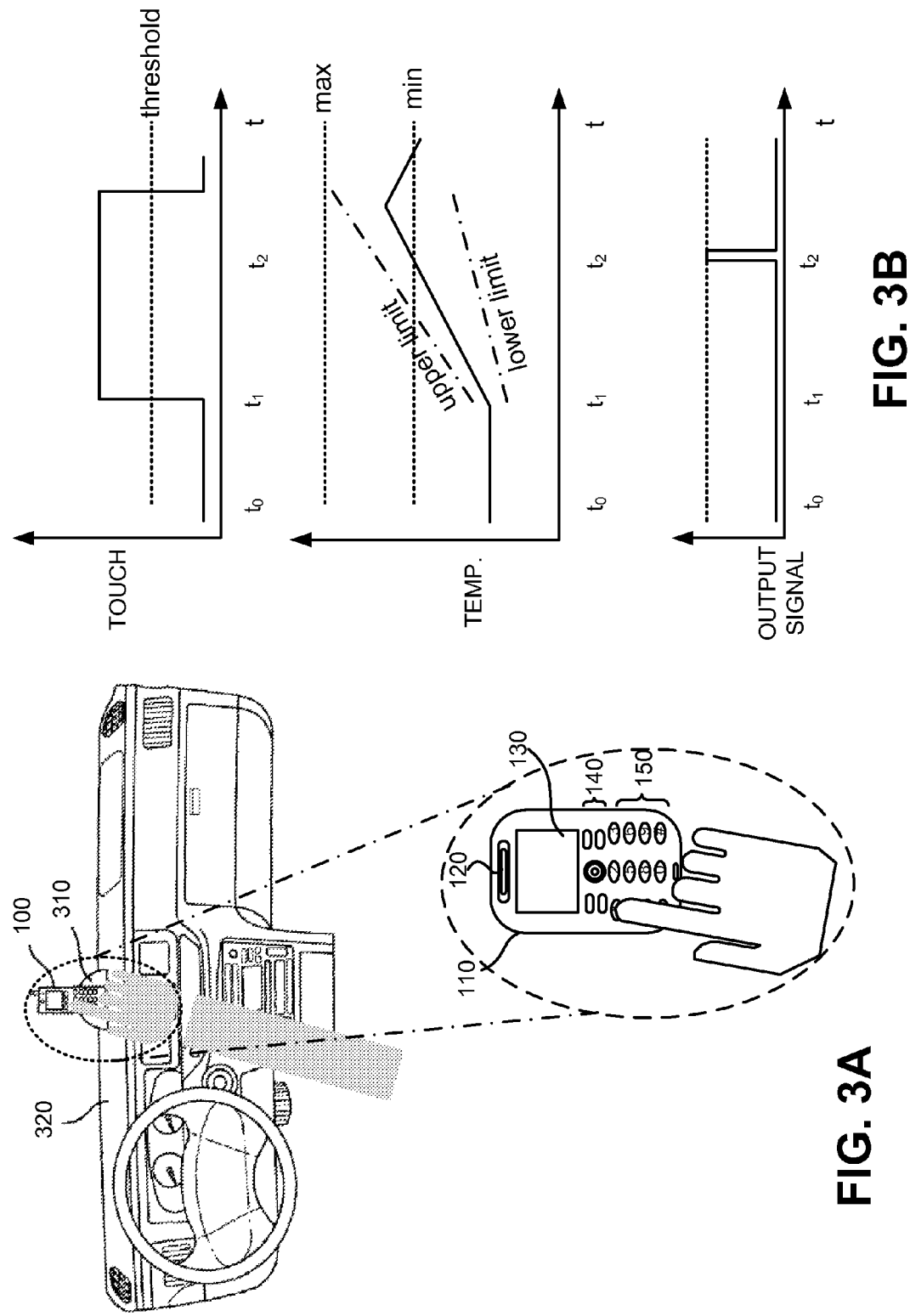
FIGS. 3A and 3B illustrate operation of the mobile terminal of FIG. 1 according to an exemplary implementation.

FIGS. 3A and 3B illustrate an exemplary operation of mobile terminal 100 by a user, for example, while mobile terminal 100 rests in holder, such as a cradle 310 that is mounted to a dashboard 320 of a car. Mobile terminal 100 may be operated, for example, via display 130, control buttons 140, and/or keypad 150, as described in detail below with respect to exemplary input states displayed in the graphs of FIG. 3B. Display 130, control buttons 140, and/or keypad 150 may be placed in an enabled, disabled, and/or partially disabled state of operability via activation/deactivation of a key lock, as will be described in more detail below. In one implementation, the key lock may be a user-configurable key lock. For example, a user may select one or more detectable parameters by which the key lock may be activated and/or deactivated.

Referring to FIG. 3A, a user may use a finger to contact input mechanisms of display 130, control buttons 140, and/or keypad 150, for example, to activate/deactivate the key lock. In another implementation, the key lock may be activated/deactivated, for example, based on simultaneous contact of two or more input mechanisms. In another implementation, the key lock may be activated/deactivated, for example, based on contact of two or more input mechanisms in a predetermined sequential order. In another implementation, the key lock may be activated/deactivated, for example, based on a predetermined amount of time associated with non-operation and/or delay between operations of the input mechanisms. In still another implementation, the key lock may be activated based on receiving an audible (e.g., voice) command.

Referring to FIG. 3B, the key lock may be activated/deactivated, for example, based on the sensing of a number of parameters associated with the input mechanism being manipulated by the user, as will be described below. In one implementation, operation of the key lock may be based on a sensed presence and heat transfer detected by the input mechanism being operated by a user, for example, via a single point of sensing. For example, FIG. 3B illustrates a number of graphs depicting a state of touch (e.g., resistance, capacitance, etc.) and a thermal state sensed at an input mechanism and a corresponding output signal from the input mechanism, as a function of time (t) associated with presence of the user's finger relative to a designated input mechanism (FIG. 3A). Operation of the key lock may be based on other parameters and/or combinations of parameters sensed at the designated input mechanism.

EXEMPLARY PROCESSING

Figure 4:
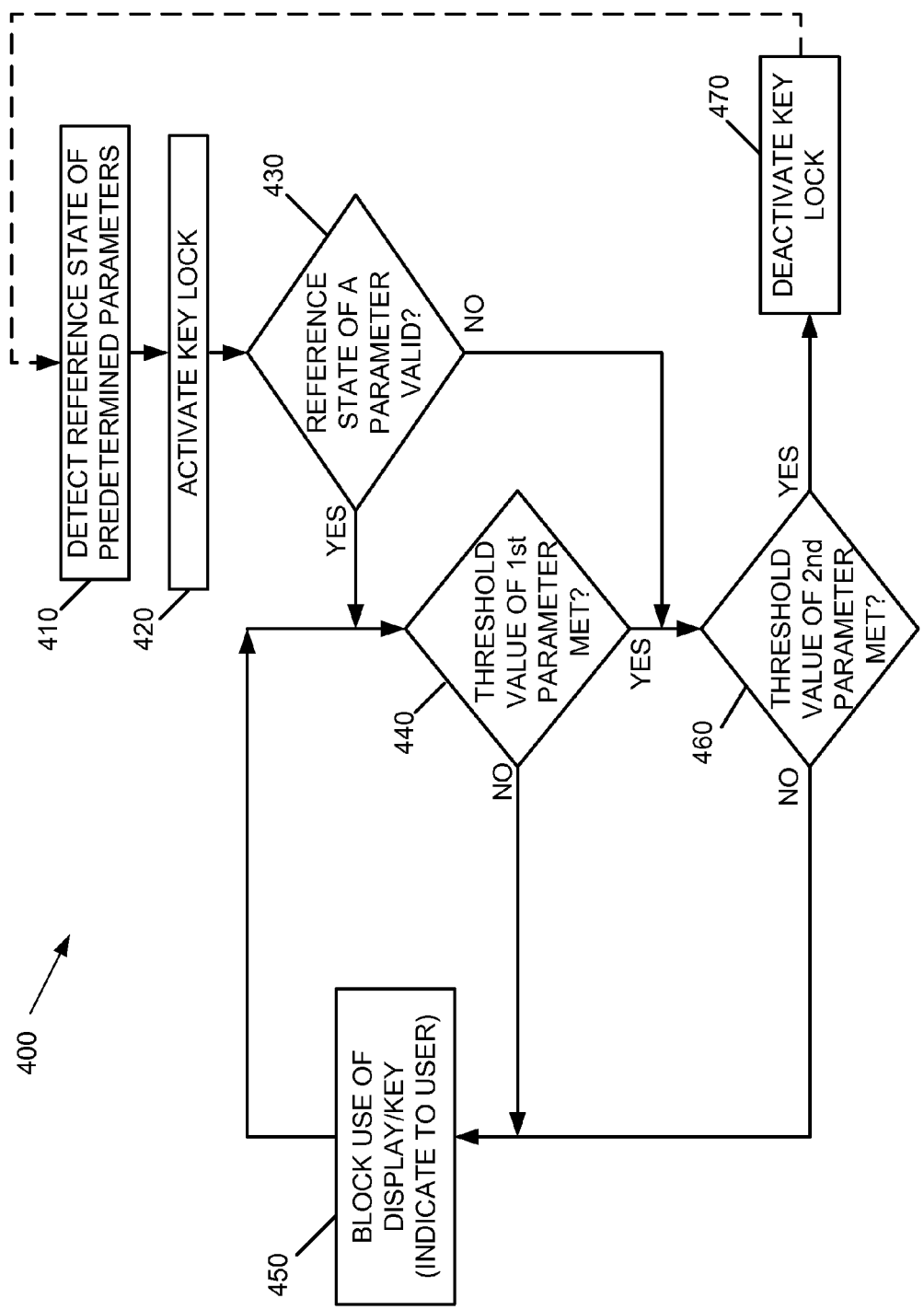
FIG. 4 is a flow diagram illustrating exemplary processing by the mobile terminal of FIG. 1.

FIG. 4 is a flow diagram illustrating an exemplary process 400 associated with the use of mobile terminal 100 in one implementation. Processing may begin, for example, when mobile terminal 100 powers up. In some implementations, mobile terminal 100 may allow the user to customize particular lockout features based on user preferences. For example, input device 240 may provide a menu of options to the user. The menu may allow the user to select what input functions will be disabled under which conditions. For example, key lock functions may be configured for one or more profiles associated with the operation of mobile terminal 100. Default key lock configurations may be implemented in the absence of selections by the user. For example, display 130 and control buttons 140 may be inoperable while one or more keys in keypad 150 are operable, for instance, where mobile terminal 100 includes a flip-cover positionable over keypad 150.

In one implementation, process 400 may begin with detection of a reference state(s) of one or more parameters of the input mechanisms of display 130, control buttons 140, and/or keypad 150, for example, during a mode of non-operation of the input mechanisms (act 410). Respective sensors associated with the input mechanisms may acquire temperature information for individual keys/buttons and/or ambient temperature information for groups of keys/buttons. Other sensors associated with the input mechanisms may acquire other parameter information, such as capacitance and/or resistance, etc., for individual keys/buttons and/or for ambient parameter information for groups of keys/buttons.

The acquired parameters (e.g., temperature, capacitance, resistance, force, etc.) information may be used to establish a baseline or reference state for the one or more parameters for individual input mechanisms or groups of input mechanisms. In one implementation, detecting the parameter information and establishing the reference state(s) of the input mechanisms may be an ongoing process during non-operation of the input mechanisms. Sampling sensors may be used, for example, to acquire parameter information at predetermined intervals. Referring to FIG. 3B, during a period, $t_0$ to $t_1$, reference states may be established, for example, for parameters generally expressed as "touch" and "temperature."

Referring again to FIG. 4, upon establishment of a reference state(s), process 400 may continue with activation of the key lock such that one or more of the input mechanisms is placed in a locked (disabled) or a semi-locked (partially disabled) operation mode (act 420). In one exemplary key lock mode, for example, at least limited functionality of one or more of the input mechanisms may be maintained. For example, mobile terminal 100 may maintain emergency calling capability (e.g., 9-1-1) and/or other functionality while in an otherwise key lock mode.

In one implementation, process 400 may include determining whether an established reference state lies within acceptable bounds, i.e., is valid (act 430). An upper bound may be set for a reference thermal state associated with pressing a particular input mechanism, for example, which is below the temperature of the human body. When it is determined that the reference state(s) is valid, process 400 may include sensing information that represents a detectable change from the reference state of a first parameter at an input mechanism, and determining whether a magnitude of the change exceeds a threshold value (act 440). For example, mobile terminal 100 may be configured with one or more input mechanisms having an associated threshold value for capacitance and/or resistance experienced at the input mechanism (depicted on the "Touch" graph in FIG. 3B as the dashed line labeled "threshold").

The threshold value may be configured to, for example, correspond to an expected change in capacitance and/or resistance produced by a user's finger in proximity to the input mechanism (e.g., one of the control buttons 140 and/or a key in keypad 150). In another implementation, the threshold value may correspond to a relative measure of the parameter of the input mechanism based on a measure of the parameter at one or more (e.g., proximate) input mechanisms of mobile terminal 100. For example, a capacitance and/or resistance measurement, e.g., indicative of a number of the input mechanisms being grasped during handling by a user, may affect the establishment a threshold value for the parameter with respect to any given one the input mechanisms.

When it is determined that the predetermined threshold value associated with the first parameter at an input mechanism is not met, processing logic 220 may provide control instructions to input device 240 to block operation of the input mechanism (act 450) (e.g., to account for inadvertent contact of a key/button). In one implementation, when operation of the input mechanism is blocked, mobile terminal 100 may be configured to generate an indication to the user that the input mechanism is locked, for example, via display 130 and/or speaker 120. In one implementation, the indication may include a message, such as "emergency use only," displayed on display 130. Upon blocked use of an input mechanism, mobile terminal 100 may return to a sensing mode (act 440).

Substantially concurrently with the determination whether the predetermined threshold value associated with the first parameter at an input mechanism is met (e.g., at $t_1$ in the "Touch" graph in FIG. 3B), mobile terminal 100 may acquire information that represents a detectable change from the reference state of a second parameter at the input mechanism, and determine whether the magnitude of the change exceeds a threshold value established for the second parameter (act 460). The input mechanism may have an associated threshold value, for example, for a thermal state experienced at the input mechanism (depicted on the "Temp." graph in FIG. 3B as the dashed line labeled "min"). In one implementation, the threshold value may correspond to an absolute temperature that may typically be experienced at the input mechanism during manipulation by a user's finger (e.g., at $t_1$ in the "Temp." graph in FIG. 3B). In another implementation, the threshold value may correspond to a relative temperature of the input mechanism based on a temperature(s) at one or more (e.g., proximate) input mechanisms of mobile terminal 100. In yet another implementation, the threshold value may correspond to a rate of change (delta t) to the reference thermal state that may typically be experienced at the input mechanism from heat transfer occurring during manipulation. As shown in FIG. 3B, a derivative may be calculated for the change and expressed as an upper limit and/or a lower limit that define an acceptable range associated with activation by a user's touch.

When it is determined that the predetermined threshold value associated with the second parameter at the input mechanism is not met, mobile terminal 100 may block operation of the input mechanism, as described above with respect to act 450. On the other hand, when it is determined that the predetermined threshold value associated with the second parameter at the input mechanism is met (e.g., at $t_2$ in the "Temp" graph in FIG. 3B), mobile terminal 100 may deactivate the key lock to thereby enable its operation and optionally producing an output signal (act 470). In one implementation, the key lock may be deactivated only for the one input mechanism. In other words, key lock deactivation may be accomplished on a key-by-key basis. In this case, the key lock for all inputs/keys may be deactivated. In another implementation, the one input mechanism may be a designated key lock control. In another implementation, key lock deactivation may apply to other input mechanisms that are operated during a predetermined period after the deactivation of another input mechanism. After the predetermined period and/or non-operation of the input mechanisms, mobile terminal 100 may return to processing as described above with respect to act 410.

Referring again to act 430, when it is determined that a reference state is invalid (e.g., a temperature state of the input mechanism is substantially exceeds that of the human body, for example, from being in a pocket or in direct sunlight, etc.), mobile terminal 100 may bypass the above-described process with respect to act 440, and proceed to act 460. That is, deactivation of the key lock may be accomplished when it is determined that the predetermined threshold value associated with only one parameter(s) at an input mechanism being met. For example, if a temperature of mobile terminal 100 exceeds a maximum level (e.g., depicted in the "Temp." graph in FIG. 3B), such as the result of mobile terminal 100 being in direct sunlight, the temperature parameter may be disregarded with respect to deactivation of the key lock. In still further alternatives, an invalid value associated with one of the two parameters (such as temperature) may be considered to effectively be an indication that the value of that parameter does not exceed the threshold. That is, in this example, the value exceeding the maximum temperature value may indicate that a user has not pressed an input button. Alternatively, mobile terminal 100 may be configured to substitute another condition for the invalid parameter in determining whether to deactivate a key lock function, such that two or more conditions need to be satisfied for deactivation of the key lock. For example, a substitute parameter(s) may be selectable by a user.

CONCLUSION

Implementations described herein aid in preventing unintended operation of input mechanisms (e.g., keys, buttons, dials, display panels, etc.) via a user interface, for example, by distinguishing between localized heating by manipulation of an input mechanism and ambient-type heating associated with a group of input mechanisms. Some implementations may distinguish between manual operation and inanimate contact. Advantageously, the input mechanisms may be readily enabled for operation when a user intends to input information via the user interface, for example, by manipulating an input mechanism(s), without any additional action required on the part of the user. With respect to a mobile terminal, for example, implementations provide a key lock functionality that may be deactivated via one or multiple sensor devices associated with a single input mechanism, such that the key lock may be de-activated while the mobile terminal is within a carrying case, a belt clip, a cradle, or in other circumstances in which the housing of mobile terminal is not contacted by the user (e.g., lying on a table or other surface).

The foregoing description of the embodiments of the invention provides illustration and description, but is not intended to be exhaustive or to limit the invention to the precise form disclosed. Modifications and variations are possible in light of the above teachings or may be acquired from practice of the invention.

For example, aspects of the invention have been mainly described in the context of a mobile terminal. The invention, however, may be used with any type of electronic device with a user interface. For example, aspects of the invention may be implemented in a personal computer, laptop computer, personal digital assistant (PDA), MP3 player, or any other device that receives user input.

Further, while a series of acts have been described with respect to FIG. 4, the order of the acts may be varied in other implementations consistent with the invention. Moreover, non-dependent acts may be performed in parallel. In addition, with respect to FIG. 3B, the times (t) associated with sensing the parameter states may be on the order of seconds and/or fractions of seconds, such as tenths, hundredths, milliseconds, or less. It will be appreciated that times (t) may be user-configurable and/or based on one or more properties of the sensor.

It will also be apparent to one of ordinary skill in the art that aspects of the invention may be implemented in methods and/or computer program products. Accordingly, the invention may be embodied in hardware and/or in software (including firmware, resident software, micro-code, etc.). Furthermore, the invention may take the form of a computer program product on a computer-usable or computer-readable storage medium having computer-usable or computer-readable program code embodied in the medium for use by or in connection with an instruction execution system. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as a processor, microprocessor, an application specific integrated circuit or a field programmable gate array, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A mobile communication device having a plurality of user input mechanisms, the mobile communication device comprising:
   a housing to support the plurality of user input mechanisms;
   at least one sensor to sense parameter information associated with a first one of the plurality of user input mechanisms; wherein the at least one sensor is at least one of acoustically-sensitive and photo-sensitive;
   logic to:
      determine, based on the sensed parameter information, a reference state associated with the first one of the plurality of user input mechanisms;
      determine, based on the reference state, a change in the parameter information at the first one of the plurality of user input mechanisms; and
      enable operation of the first one of the plurality of user input mechanisms based on the determined change in the parameter information; and
   where the parameter information comprises a time rate-of-change of a temperature at the first one of the plurality of user input mechanisms.

2. The mobile communication device of claim 1, where the parameter information comprises tactile information corresponding to a position of a finger of a user relative to the first one of the plurality of user input mechanisms.

3. The mobile communication device of claim 1, where the logic enables the operation of the first one of the plurality of user input mechanisms based on a concurrent sensing of a plurality of parameter information.

4. The mobile communication device of claim 3, where the parameter information further comprises a temperature at the first one of the plurality of user input mechanisms corresponding to a position of a portion of a user relative to the first one of the plurality of user input mechanisms.

5. The mobile communication device of claim 1, where the logic:
determines whether the reference state comprises a valid reference state based on a predetermined value, and
enables, when the reference state is determined not to comprise the valid reference state, the operation of the first one of the plurality of user input mechanisms.

6. The mobile communication device of claim 1, where the logic:
determines, based on the parameter information and the reference state, that a thermal threshold value is achieved, and
enables the operation of the first one of the plurality of user input mechanisms when the thermal threshold value is determined to be achieved.

7. The mobile communication device of claim 6, where the logic:
determines whether the reference state comprises a valid reference state, and where, when the reference state is determined not to comprise the valid reference state, the thermal threshold value is deemed to have been achieved.

8. The mobile communication device of claim 1, where the logic:
enables the operation of at least a second one of the plurality of user input mechanisms based on parameter information associated with the at least a second one of the plurality of user input mechanisms.

9. The mobile communication device of claim 1, where the logic:
enables operation of another one of the plurality of user input mechanisms based on the enabled operation of the first one of the plurality of input mechanisms.

10. The mobile communication device of claim 1, where the parameter information is selected by a user.

11. The mobile communication device of claim 1, where the logic:
disables the operation of the first one of the plurality of user input mechanisms after a predetermined amount of time.

12. The mobile communication device of claim 1, where the logic:
disables the operation of the first one of the plurality of user input mechanisms based on the parameter information sensed by the at least one sensor.

13. The mobile communications device of claim 6, further comprising:
means for determining a heat transfer rate associated with the parameter information, wherein the thermal threshold value is based on the heat transfer rate.

14. A mobile communication device having a plurality of user input mechanisms, the mobile communication device comprising:
a housing to support the plurality of user input mechanisms;
at least one sensor to sense parameter information associated with a first one of the plurality of user input mechanisms; wherein the at least one sensor is at least one of acoustically-sensitive and photo-sensitive;
logic to:
determine, based on the sensed parameter information, a reference state associated with the first one of the plurality of user input mechanisms;
determine, based on the reference state, a change in the parameter information at the first one of the plurality of user input mechanisms; and
enable operation of the first one of the plurality of user input mechanisms based on the determined change in the parameter information; and
where the at least one sensor senses at least two different types of parameter information at a single point of contact.

15. In a communication device including a plurality user input mechanisms, a method comprising:
providing a housing to support the plurality of user input mechanisms;
providing at least one sensor to:
sense parameter information at a first one of the plurality of user input mechanisms, wherein the at least one sensor is at least one of acoustically-sensitive and photo-sensitive;
providing logic to:
determine, based on the sensed parameter information, a reference state associated with the first one of the plurality of user input mechanisms;
determine, based on the reference state, a change in the parameter information at the first one of the plurality of user input mechanisms;
enable operation of the first one of the plurality of user input mechanisms based on the determined change in the parameter information; and
determine whether the reference state comprises a valid reference state based on a predetermined value; and
wherein the first threshold is based on a difference between the reference state and the sensed thermal parameter information.

16. The method of claim 15, further comprising:
deactivating a lock on operation of at least one of the first one of the plurality of user input mechanisms or a second one of the plurality of user input mechanisms when the parameter information attains a first threshold.

17. The method of claim 15, further comprising:
determining whether the reference state comprises a valid reference state based on a predetermined value.

18. The method of claim 16, wherein when the reference state is invalid, the method further comprises:
deeming the first threshold to be attained irrespective of the detected parameter information.

19. The method of claim 18, further comprising:
deactivating a lock when the detected parameter information reaches the first threshold.

20. In a communication device including a plurality user input mechanisms, a method comprising:
providing a housing to support the plurality of user input mechanisms;
providing at least one sensor to:
sense parameter information at a first one of the plurality of user input mechanisms, wherein the at least one sensor is at least one of acoustically-sensitive and photo-sensitive;
providing logic to:
determine, based on the sensed parameter information, a reference state associated with the first one of the plurality of user input mechanisms;
determine, based on the reference state, a change in the parameter information at the first one of the plurality of user input mechanisms;
enable operation of the first one of the plurality of user input mechanisms based on the determined change in the parameter information; and
determine whether the reference state comprises a valid reference state based on a predetermined value; and wherein the parameter information comprises a time rate-of-change of a temperature at the first one of the plurality of user input mechanisms.

21. A mobile communication device having a plurality of user input mechanisms, the mobile communication device comprising:
a housing to support the plurality of user input mechanisms;
at least one sensor to sense parameter information associated with a first one of the plurality of user input mechanisms; wherein the at least one sensor is at least one of acoustically-sensitive and photo-sensitive;
logic to:
determine, based on the sensed parameter information, a reference state associated with the first one of the plurality of user input mechanisms;
determine, based on the reference state, a change in the parameter information at the first one of the plurality of user input mechanisms; and
enable operation of the first one of the plurality of user input mechanisms based on the determined change in the parameter information;
wherein:
the first one of the plurality of user input mechanisms comprises a thermo-sensitive, tactile-responsive user interface; and
a key lock to control input via the user interface, wherein operation of the key lock is based on a determined change in a thermal parameter information and a touch detected by the user interface.

22. The mobile communications device of claim 21, wherein the detection of the determined change in the thermal parameter information occurs concurrently with the detection of the touch.

* * * * *